United States Patent
Fukuda et al.

(10) Patent No.: US 6,849,361 B2
(45) Date of Patent: Feb. 1, 2005

(54) MANUFACTURING METHOD FOR SINTERED SUBSTRATE OF ALKALINE STORAGE BATTERY

(75) Inventors: Hiroshi Fukuda, Tokushima (JP); Masao Takee, Tokushima (JP); Hideo Kasuga, Sumoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 357 days.

(21) Appl. No.: 10/055,373

(22) Filed: Jan. 25, 2002

(65) Prior Publication Data

US 2002/0150821 A1 Oct. 17, 2002

(30) Foreign Application Priority Data

Jan. 31, 2001 (JP) ........................................ 2001-024329

(51) Int. Cl.[7] .......................... H01M 4/70; H01M 4/04; H01M 4/74; H01M 4/66
(52) U.S. Cl. ............................. 429/235; 29/2; 29/623.5; 429/233; 429/236; 429/241
(58) Field of Search ............ 29/2, 623.5; 429/233–236, 429/245

(56) References Cited

FOREIGN PATENT DOCUMENTS

| EP | 1229599 | * 8/2002 | ............ H01M/4/66 |
| JP | 59-158047 | * 2/1986 | ............ H01M/4/80 |

OTHER PUBLICATIONS

RD 333,065, Jan. 1992, RD, Inco.*

* cited by examiner

Primary Examiner—Mark Ruthkosky
(74) Attorney, Agent, or Firm—Westerman, Hattori, Daniels & Adrian, LLP

(57) ABSTRACT

A manufacturing method for a sintered substrate of alkaline batteries is provided. The manufacturing method includes a first step for mixing particles with a pore former and applying the mixture to a porous substrate, and a second step for sintering the porous substrate and the applied mixture. The particles are made of nickel or principally made of nickel, and the surfaces of the pore former particles each have a coating made of nickel or principally made of nickel. The pore former can be made from resin or any other materials if it disappears when sintered. The pore former particles should preferably have a spheric shape, but is does not matter whether the pore former particles are solid or hollow. Using such sintered substrate for an electrode, an alkaline storage battery can exhibit a high performance.

6 Claims, 4 Drawing Sheets

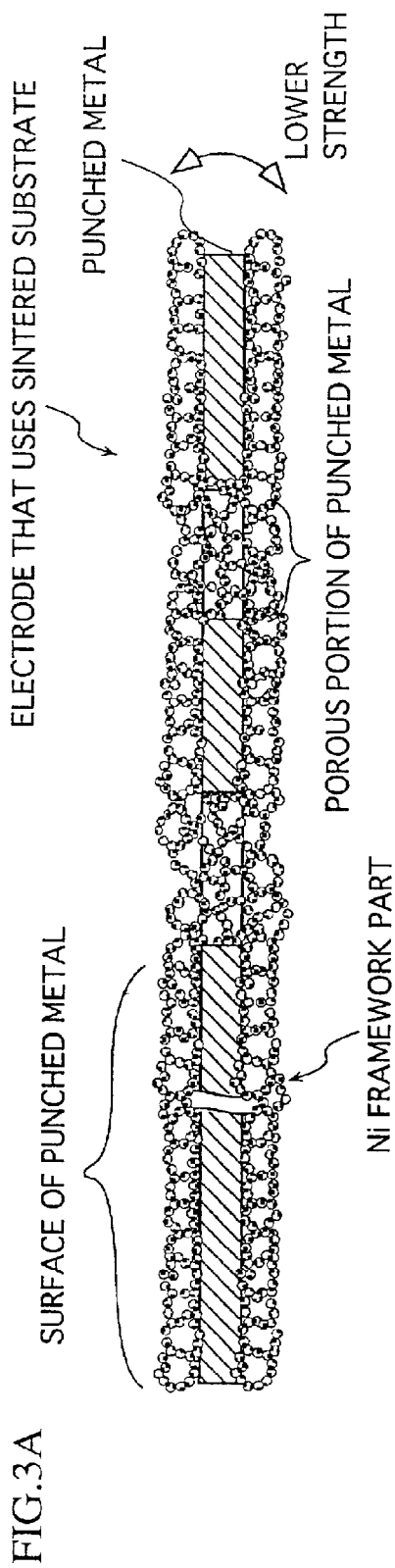
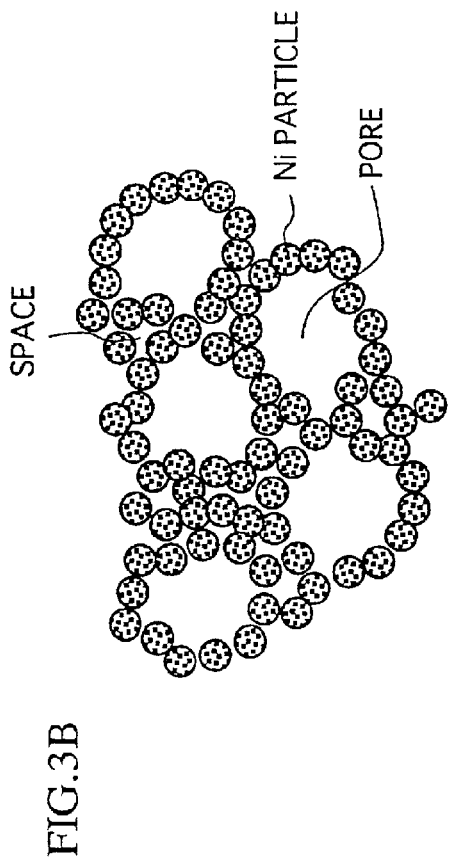
FIG.3A
FIG.3B

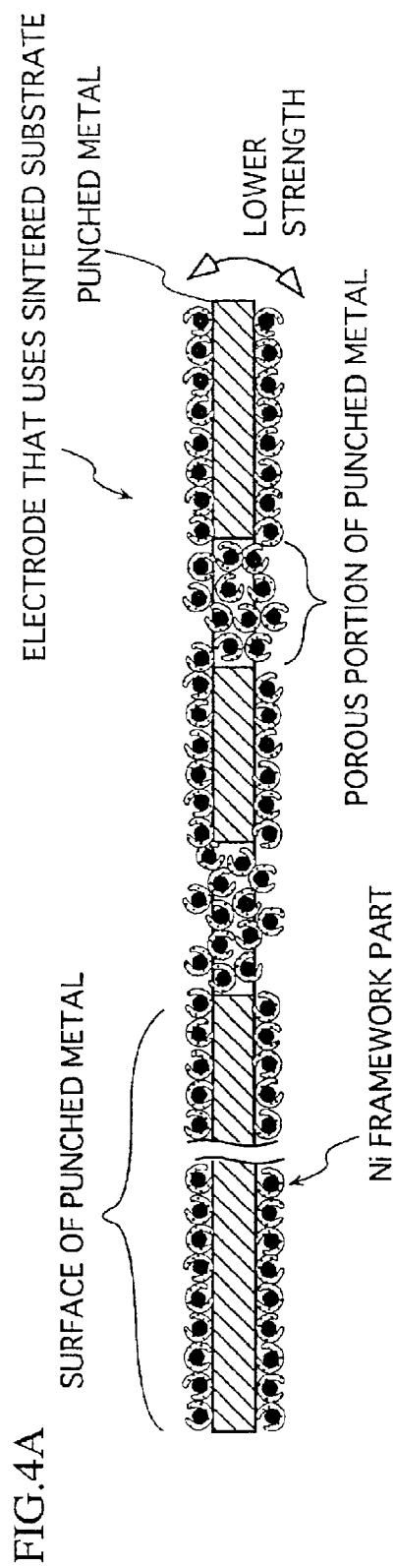
FIG.4A
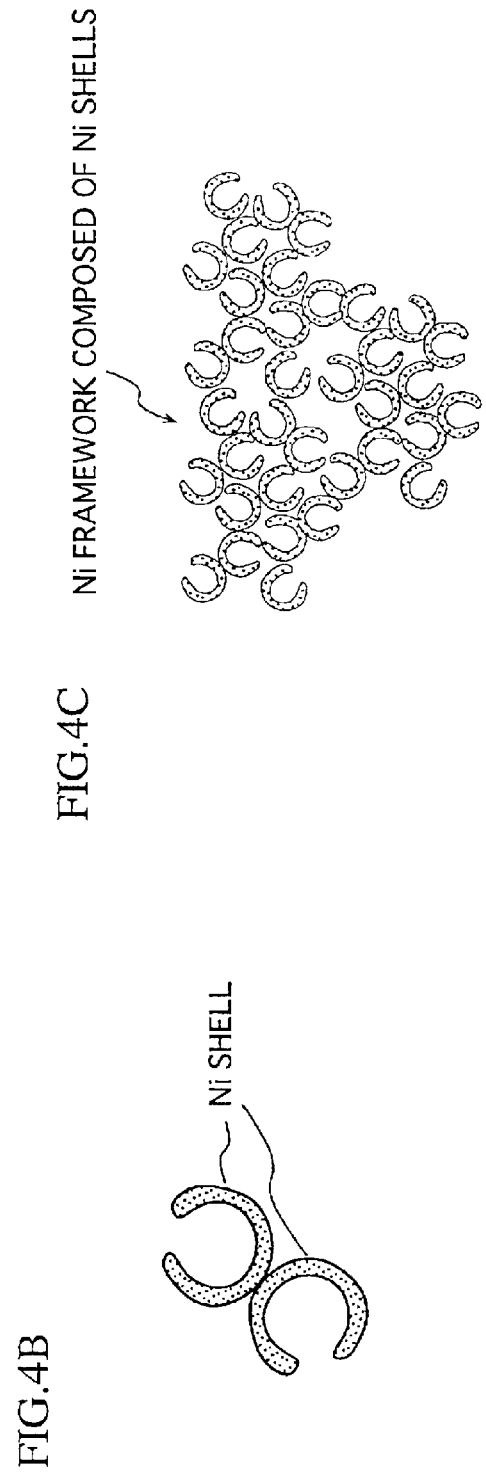
FIG.4B
FIG.4C

MANUFACTURING METHOD FOR SINTERED SUBSTRATE OF ALKALINE STORAGE BATTERY

BACKGROUND OF THE INVENTION (1) Field of the Invention

The present invention relates to a sintered substrate of alkaline batteries and the manufacturing method thereof.

(2) Related Art

As substrate grids for electrodes of alkaline batteries including nickel-hydrogen storage batteries, sintered substrates have been commonly used. A sintered substrate is formed by applying nickel powder to a porous substrate made of nickel or the like, and by sintering the substrate. Among such porous substrates are punched metals and punched nickel plates. By impregnating the sintered substrate with an active material, an electrode can be formed. The production of alkaline batteries having a higher energy density, however, requires an increased amount of impregnated active material, since the operation of a battery is greatly dependent on the active material. To meet this requirement, it is preferable that sintered substrates have a high porosity and hold a sufficient amount of active material in those pores.

Such porous sintered substrate is attainable by using a punched metal with a reduced thickness or with an increased porosity. Though such methods are considered as valid, some other methods have been developed.

One example is a technique disclosed by the Japanese Patent Laid-Open Application Number S60-65464, in which a sintered substrate is formed by applying slurry made of nickel powder, water and pore former (hollow resinous particles) to a punched metal. Another example is a technique disclosed by the Japanese Patent Laid-Open Application Number S61-185685 in which a sintered substrate is formed by applying a mixture of water and metal-coated pore former particles to a punched metal and then sintering the punched metal together with the mixture.

FIG. 3 shows an electrode that uses a sintered substrate formed based on the former technique. Here, the nickel particles (FIG. 3B) and the core (punched metal) are sintered and bonded together to form a nickel framework (FIG. 3A). There are relatively small spaces among nickel particles in the nickel framework, and there are relatively large spaces between the nickel frameworks, which are formed by the effect of pore former FIG. 4 shows an electrode that uses a sintered substrate manufactured according to the latter technique. As shown in the drawing, a punched metal and hollow spheric nickel shells (FIG. 4B) are sintered together to form a nickel framework (FIG. 4A). The nickel shells of this nickel framework (FIG. 4C) have relatively large pores, and they are joined together with some spaces in-between. Though not illustrated here for the sake of convenience, these pores and spaces are filled with an active material.

These two techniques can produce sintered substrates with relatively high porosity. However, the sintered substrates have a problem of strength. Sintered substrates manufactured by the former technique have a higher porosity, with relatively large pores formed inside the nickel frameworks by the effect of the pore former. But this porous construction can cause brittle failure, including surface detachment and cracking. Likewise, sintered substrates according to the second technique have pores of an average size generated from metal-plated pore former. But these sintered substrates do not have a sufficient level of strength, and they are weak especially against stress applied from the direction of the thickness. This can cause a problem similar to those with the first technique. Such problems can occur whether the shape of the battery is cylindrical or rectangular.

SUMMARY OF THE INVENTION

The present invention intends to provide a manufacturing method for producing sintered substrates of alkaline batteries having high porosity and high strength.

In view of the above problems, (claim 1)

Note that the term 'pore former' refers to a substance that remains in the form of particles when a first step is completed but disappears during a second step. The pore former includes resinous powder which dissipates when it is burned.

Generally, pore former is provided in the form of spheric particles having a diameter greater than that of a particle made of nickel or principally made of nickel. The pore former is mixed and knead with the particles that are made of nickel or principally made of nickel, to be arranged almost uniformly in spaces between the nickel particles, so that some of the spaces between them are pressurized and enlarged.

This makes up a layer, containing the pore former and the particles made of nickel or principally made of nickel, on the surface of the porous substrate. The surfaces of the pore former particles are covered with a coating made of nickel or principally made of nickel. When the nickel particles and nickel coatings are sintered together in the second step, pore former disappear to form pores, which makes the nickel framework of the present invention.

In this nickel framework, there are relatively small spaces among the nickel particles, among the nickel shells, and between a nickel particle and a nickel shell. There are also relatively large pores in the nickel framework in the place of the dissipated pore former. This increases the porosity of a formed sintered substrate, compared with conventional sintered substrates.

In other words, the nickel framework is constructed in such a manner that a nickel particle surrounds a nickel shell, and the nickel shell surrounds a relatively large pore. This gives strength and thickness to parts of the nickel framework surrounding relatively large pores, preventing the occurrence of brittle failure. Therefore, even with a higher porosity, the sintered substrate of the present invention can preserve the strength.

Compared with sintered substrates manufactured by a conventional manufacturing method which uses non-Ni-coated pore former particles and particles that are made of nickel or principally made of nickel, the sintered substrate of the present invention has high strength. At the same time, the sintered substrate has a greater porosity than sintered substrates manufactured according to a conventional technique which uses only metal-plated pore former particles.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 show the construction of a positive electrode that uses a conventional sintered substrate, with FIG. 3A showing cross-sections of the conventional positive electrode and FIG. 3B showing an enlarged view of its nickel framework; and FIG. 4 show the construction of a positive electrode that uses another conventional sintered substrate, with FIG. 4A showing cross-sections of the conventional positive electrode and FIG. 4B showing an enlarged view of its nickel shells. FIG. 4C shows, nickel framework composed of nickel shells.

DESCRIPTION OF PREFERRED EMBODIMENTS

1. Embodiment 1-1. Construction of Alkaline Storage Battery

Figure 1:
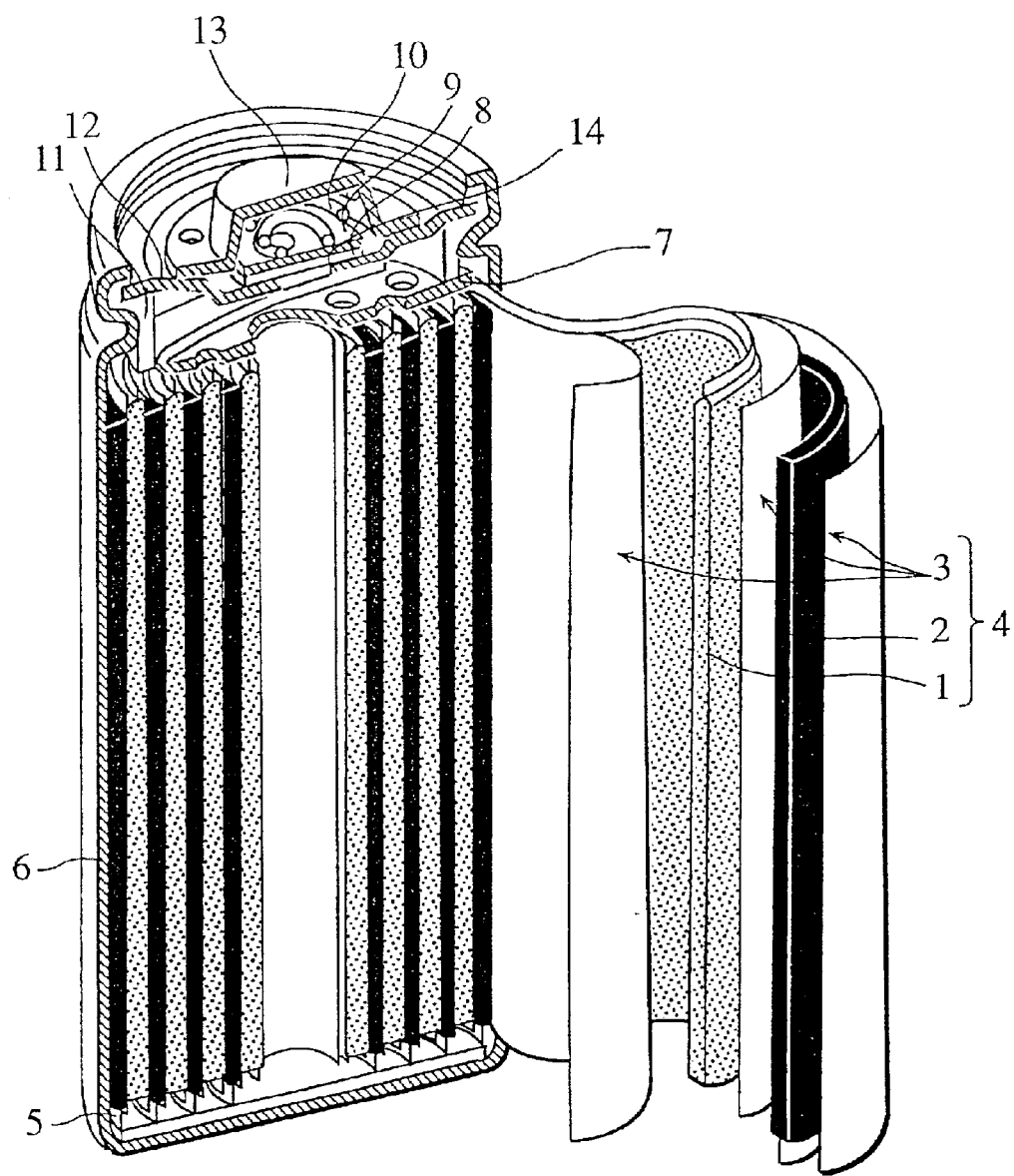
FIG. 1 is a perspective view showing a cross-section of a cylindrical alkaline storage battery that is an example application of the present invention.

FIG. 1 is a perspective view showing a cross-section of a cylindrical alkaline storage battery (a nickel-hydrogen storage battery) that is an embodiment of a sintered substrate manufactured by a method of the present invention. In this embodiment, the sintered substrate is used for a positive electrode 1.

The alkaline storage battery consists of a set of electrodes 4 and a cylindrical external casing 6 of AA size. The set of electrodes 4, impregnated with an electrolytic solution, is housed in the cylindrical external casing 6. The set of electrodes 4 is formed by spirally winding a positive electrode 1 and a negative electrode 2 with a separator 3 in-between.

The negative electrode 2 is formed from a Ni-plated porous Fe substrate (e.g. a punched metal). A paste containing hydrogen-absorbing alloys is applied to the substrate before sintering. The negative electrode 2 is connected by a negative collector 5 to an inner base surface of the external casing 6 which serves as a negative electrode terminal.

An opening at the tip of the external casing 6 is closed with a sealing plate 12 via a gasket 11. A positive electrode terminal 13 is inserted to cover a central opening 14 of the sealing plate 12. Between the sealing plate 12 and positive electrode terminal 13, there arranged a valve plate 8, a holding plate 9 and a coil spring 10 in this order from the bottom. The valve plate 8 and the holding plate 9 can work as a safety valve when they are pressed, due to the elasticity of the spring 10, against the vicinity of the central opening 14.

The positive electrode 1 is joined by a positive collector 7 and the sealing plate 12 with the positive electrode terminal 13. The construction of the positive electrode 1 is described in the following.

1-2. Construction of Positive Electrode

Figure 2A:
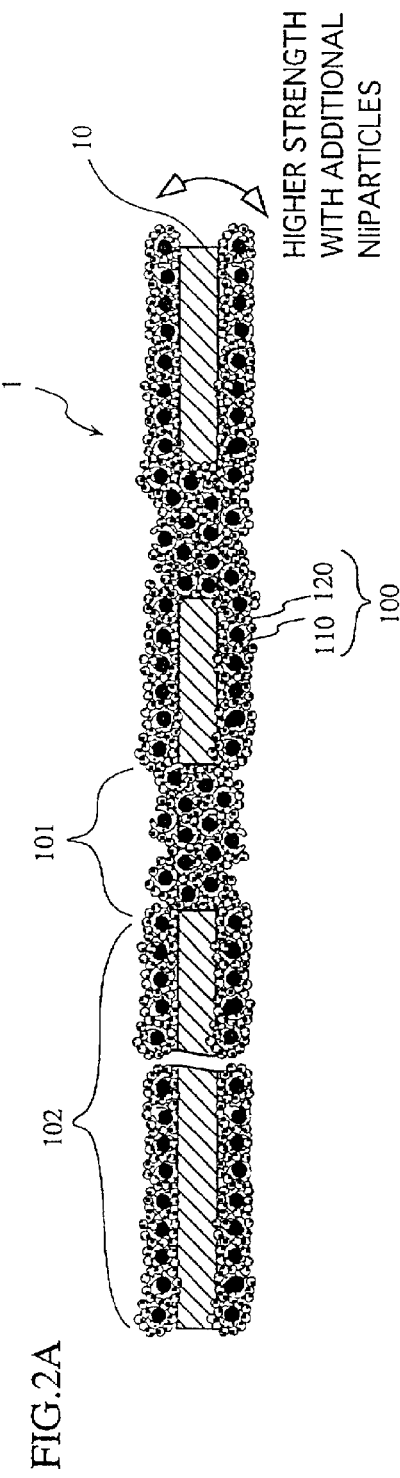
FIG. 2 show the construction of a positive electrode that uses a sintered substrate of the present invention, with FIG. 2A showing cross-sections of the positive electrode and FIG. 2B showing an enlarged view of its nickel framework.

FIG. 2A shows cross-sections of the positive electrode in this embodiment. The positive electrode 1 is composed of nickel frameworks 100, which uses a punched metal 10 as a porous substrate grid, nickel particles 120 and nickel shells 110 formed on the surface of the punched metal 10.

The punched metal 10 is formed by plating a plate-like Fe core with nickel. On the surface of the punched metal 10, there are through holes 101 formed sporadically. The nickel framework 100 is arranged so as to fill in the through holes 101 and to cover the surfaces of the punched metals 10 in a layered form.

The nickel framework 100 shows several characteristics that are essential to the manufacturing method of the present invention. First, the nickel framework 100 of FIG. 2B consists of the nickel particles 120 and the nickel shells 110a that are sintered together. Secondly, there are relatively small spaces 110c among the nickel particles 120, among the nickel shells 110a, and between a nickel particle 120 and a nickel shell 110a. Thirdly, the nickel shell 110a has a relatively large pore (in FIGS. 2A and 2B, such relatively large pores are filled with an active material) which is formed in the place of a pore forming particle that disappeared when sintered. Lastly, inside the inner wall of the relatively large pore, there adhered is the nickel shell 110a that is what used to be a coating on the surface of the pore forming particle.

The nickel shell 110a is obtained from a nickel coating formed on the surface of a pore forming particle. When sintering the punched metal 10 together with the applied slurry containing a mixture of the nickel particles and the pore former, the pore former disappears, leaving the nickel shells 110a instead.

The pore former particles should preferably be made of a material that dissipates during the sintering step, specifically, from resins. But the pore former can be made from any material on condition that the material, applied on a punched metal, can disappear by means of some processing.

With those relatively large pores which are the residue of the lost pore former particles, nickel framework 100 shows a greater porosity than a conventional nickel framework that is made up only of sintered nickel particles. Also, the nickel framework 100 is constructed in such a manner that the relatively large pores are each surrounded by the nickel shell 110a, and the nickel shell 110a are each surrounded by the nickel particles, and these elements are fusion-bonded. This gives strength and thickness to parts of the nickel framework 100 surrounding the large pores, preventing the occurrence of brittle failure. This makes it possible to produce a sintered substrate having a great porosity without degrading its strength. Therefore, compared with conventional manufacturing methods for producing sintered substrates from non-Ni-coated particles or only from metal-plated pore former particles, the manufacturing method of the present invention can produce a sintered substrate with high strength and high porosity.

Figure 2B:
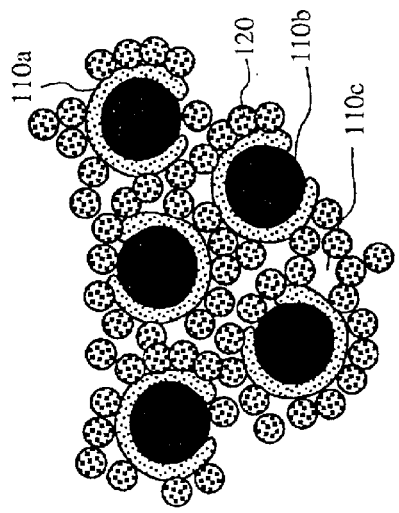

The sintered substrate is filled with an active material. Any commonly used methods can serve for this purpose, including impregnating. This active material is put in the relatively small spaces 110c of the nickel framework and the relatively large pores 110b (as shown in FIG. 2B, the small spaces among the nickel particles 120 are actually filled with the active material), to ensure that a formed positive electrode 1 is filled with a sufficient amount of active material in light of a conventional electrode.

With the sintered nickel particles 120 being arranged around and in contact with the sintered nickel shells 110, the nickel framework of the positive electrode 1 shows much higher strength against a stress applied from the direction of the thickness of the positive electrode 1, as shown in FIG. 2A, than a nickel framework composed merely of nickel shells. Therefore, when such a positive electrode is spirally wound to fit in the cylindrical external casing 6, it is less likely to suffer the formation of cracks on the surface than conventional ones. By using such sintered substrates, batteries of superior characteristics can be manufactured.

2. EXAMPLES 2-1. Manufacturing Actual Examples and Comparative Examples

The following describes a manufacturing method for the sintered substrate that is the embodiment of the present invention. As actual examples, a sintered substrate for the positive electrode 1 and slightly modified sintered substrates were prepared. The following also describes sintered substrates of comparative examples.

The following describes the way to manufacture these actual examples and comparative examples in detail.

Actual Example 1

Firstly, carbonyl nickel powder having an average diameter of 2 μm and an apparent density of 0.5 g/cm³ was mixed with water and methylcellulose (carbonyl nickel powder-100%, water-100%, methylcellulose-2%, by weight), before adding 10 wt % of Ni-coated pore former particles into the mixture. The pore former particles were made of a resin, such as acrylonitrile and methyl methacrylate, and their surfaces were coated with a nickel layer having a thickness of 1 μm to 5 μm (specifically, those particles are coated with nickel). The mixture was then stirred to make slurry. The slurry was applied to the surface of a punched metal, or a Ni-plated Fe core, dried and sintered in a furnace at temperatures ranging from 800° C. to 1000° C.

During the sintering, a resinous component of the slurry disappeared, leaving its Ni-plated parts in the form of nickel shells. In the meantime, the punched metal, nickel shells and nickel particles have partially molten to form minute spidery nickel frameworks. As a result of this process, the sintered substrate of actual example 1 was formed.

Actual Example 2-A

While the spheric pore former particles are made from solid resinous particles in the actual example 1, the spheric pore former particles used for the substrate of actual example 2-A are hollow and coated with nickel (these hollow spaces are filled with a hydrocarbon having a low melting point, such as butane and methane). These hollow pore former particles are used by 8 weight percent for the actual example 2-A. Note that it is possible to make the substrate of the present invention from hollow pore former particles. At the early stage of the sintering process, a hydrocarbon that has a low boiling point and was filled in the hollow spaces disappeared, which facilitated the process of forming pores. Apart from this point, the substrate of this actual example 2-A was the same as the substrate of the actual example 1.

Actual Example 2-B

The substrate of this actual example 2-B was the same as the substrate of the actual example 2-A, except that it used 10 wt % of the Ni-coated hollow spheric pore former particles, as used for the actual example 2-A.

Actual Example 2-C

The substrate of the actual example 2-C was the same as the substrate of the actual example 2-A, except that it used 12 wt % of the Ni-coated hollow spheric pore former particles, as used for the actual example 2-A.

Actual Example 3

The substrate of the actual example 3 was the same as the substrate of the actual example 2-A, except that it used 12 wt % of Ni-coated hollow spheric pore former particles that contain 0.01% of P.

<Comparative Example 1-A>

The substrate of the comparative example 1-A was the same as the substrate of the actual example 2-A, except that it used 3 wt % of hollow spheric pore former particles that were not coated with nickel.

<Comparative Example 1-B>

The substrate of the comparative example 1-B was the same as the substrate of the actual example 2-A, except that it used 4 wt % of hollow spheric pore former particles that were not coated with nickel.

<Comparative Example 1-C>

The substrate of the comparative example 1-C was the same as the substrate of the actual example 2-A, except that it used 5 wt % of hollow spheric pore former particles that were not coated with nickel.

<Comparative Example 2>

The substrate of the comparative example 2 was the same as the substrate of the actual example 1, except that it used 60 wt % of the Ni-coated hollow spheric pore former particles, as used for the actual example 1.

The features of the actual examples and the comparative examples are given in Table 1.

TABLE 1

|  | Actual Example 1 | Actual Example 2A to 2C | Actual Example 3 | Comparative Example 1A to 1C | Comparative Example 2 |
| --- | --- | --- | --- | --- | --- |
| pore former particles | spheric | spheric and hollow | spheric and hollow | spheric and hollow | spheric and hollow |
| Nickel-coated? | Yes | Yes | Yes | No | Yes |
| Contains P? | No | No | Yes | No | No |

2-2. Measurement Tests

The following measurement tests were conducted on the sintered substrates of the actual examples and the comparative examples.

<Measurement of Porosity>

The sintered substrates were soaked in water for one hour. The porosities of the substrates were determined by the amounts of water included.

<Measurement of Strength>

A flat part of a pushpin-like metal was attached to the surface of the sintered substrates with adhesive. The forces (release forces) were measured immediately before the nickel sintered substrates were taken off from the punched metal. These forces represent the strength of the substrates.

The results of these experiments are given in Tables 2 and 3.

TABLE 2

| Actual Examples | 1 | 2A | 2B | 2C | 3 |
| --- | --- | --- | --- | --- | --- |
| Porosity (%) | 90 | 87 | 89 | 91 | 91 |
| Strength (N/cm²) | 400 | 425 | 420 | 405 | 420 |

TABLE 3

| Comparative Example | 1A | 1B | 1C | 2 |
| --- | --- | --- | --- | --- |
| Porosity (%) | 87 | 89 | 91 | 91 |

TABLE 3-continued

| Comparative Example | 1A | 1B | 1C | 2 |
|---|---|---|---|---|
| Strength (N/cm2) | 160 | 132 | 100 | 205 |

2-3. Discussions

From Tables 2 and 3, it can be clearly seen that the maximum strengths of the substrates of actual examples are four times greater than those of the comparative examples, while the porosities of the actual examples are almost the same as those of the comparative examples. This shows the effectiveness of the present invention, and is thought to be due to the following reason. After sintering, nickel coatings on the surfaces of the pore former particles were transformed into inner walls of the relatively large pores. These inner walls give strength and thickness to parts of nickel framework surrounding the pores. This helps prevent the occurrence of brittle failure.

It can also be seen that the substrate of the actual example 3, which uses slurry containing nickel and a small amount of P, has a greater strength than the actual example 2C. This is because P acted as an assisting material in the sintering, which has made the sidereal nickel framework much stronger and thicker. It is preferable that the assisting material is a material that can help reduce a sintering temperature of nickel, including P. But it is more preferable that the assisting material is one of B, In or a combination of them.

It was found that the effect of the present invention can be achieved whether the shape of the pore former particles contained in the slurry are hollow or solid. Also, it is not affected by how much the Ni-coated pore former particles are contained in the slurry on condition that the amount is within a range of those used for the actual examples. Also, the effect of the present invention will not suffer damage if the assisting material is contained in the pore former particles.

Even when the percentage of the particles contained in the slurry is smaller or greater than those used for the actual examples, the composition ratio at which the particles should be contained can be easily determined through adjustment and testing, to ensure the effect of the present invention.

From the above, the slurry should preferably have nickel particles and Ni-coated pore former particles at a ratio ranging from 60:40 to 97:3.

The sintered substrate should preferably be set within a range from 85% to 92%, so that the substrate has a sufficient active material holding capacity, and at the same time, is made stronger.

For the sake of convenience, the Ni-coated pore former particles should preferably have an average diameter ranging from 5 μm to 70 μm, and the nickel particles should preferably have an average diameter ranging from 1 μm to 5 μm.

3. Other Considerations

In addition to nickel hydrogen batteries, the present invention can be applied to other alkaline batteries, such as nickel cadmium batteries.

It should also be clear that the present invention can be applied to other forms of batteries (external casings) than the cylindrical batteries.

Finally, while the above embodiment describes the case where the present invention is used for a positive electrode, it can also be applied to a negative electrode, and both of the electrodes at the same time.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A manufacturing method for a sintered substrate of an alkaline storage battery, comprising:

a first step for mixing particles with a pore former and applying the mixture to a porous substrate, wherein the particles are made of nickel or principally made of nickel, and the pore former is provided in the form of particles which each have a coating made of nickel or principally made of nickel;

a second step for sintering the porous substrate and the applied mixture; and wherein the pore former contains an element that has an effect of lowering a sintering temperature of nickel.

2. The manufacturing method of claim 1, wherein the element that lowers the sintering temperature of nickel is at least one element selected from the group consisting of P, B and In.

3. A manufacturing method for a sintered substrate of an alkaline storage battery, comprising:

a first step for mixing particles with a pore former and applying the mixture to a porous substrate, wherein the particles are made of nickel or principally made of nickel, and the pore former is provided in the form of particles which each have a coating made of nickel or principally made of nickel; and a second step for sintering the porous substrate and the applied mixture, wherein each of the pore former particles used in the first step has a hollow space that is filled with a hydrocarbon with a low boiling point.

4. The manufacturing method of claim 3, wherein said hydrocarbon is one or more of the group consisting of butane and methane.

5. The manufacturing method of claim 3, wherein said hydrocarbon is butane.

6. The manufacturing method of claim 3, wherein said hydrocarbon is methane.

* * * * *